United States Patent
Rajadurai et al.

(10) Patent No.: US 12,081,974 B2
(45) Date of Patent: Sep. 3, 2024

(54) METHOD AND SYSTEM FOR OPTIMIZING AKMA KEY REFRESH MECHANISM IN WIRELESS NETWORK

(71) Applicant: Samsung Electronics Co., Ltd., Suwon-si (KR)

(72) Inventors: Rajavelsamy Rajadurai, Bangalore (IN); Varini Gupta, Bangalore (IN); Nivedya Parambath Sasi, Bangalore (IN); Rohini Rajendran, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 140 days.

(21) Appl. No.: 17/561,078

(22) Filed: Dec. 23, 2021

(65) Prior Publication Data

US 2022/0210640 A1    Jun. 30, 2022

(30) Foreign Application Priority Data

Dec. 29, 2020 (IN) .............................. 202041056989
Nov. 22, 2021 (IN) ............................ 2020 41056989

(51) Int. Cl.
*H04W 12/0433* (2021.01)
*H04W 12/06* (2021.01)
*H04W 12/37* (2021.01)

(52) U.S. Cl.
CPC ....... *H04W 12/06* (2013.01); *H04W 12/0433* (2021.01); *H04W 12/37* (2021.01)

(58) Field of Classification Search
CPC ......................................... H04W 12/04–0471
See application file for complete search history.

(56) References Cited

U.S. PATENT DOCUMENTS

2013/0223622 A1* 8/2013 Sowa .................... H04L 9/0891
                                                  380/270
2022/0278835 A1* 9/2022 Guo ........................ H04L 9/0861
2022/0330019 A1* 10/2022 Yu ........................ H04L 63/0876

FOREIGN PATENT DOCUMENTS

WO    2017/173561 A1    10/2017
WO    2020/152087 A1    7/2020

OTHER PUBLICATIONS

Indian Office Action dated Jul. 6, 2022, issued in Indian Application No. 202041056989.

(Continued)

*Primary Examiner* — Daniel B Potratz
(74) *Attorney, Agent, or Firm* — Jefferson IP Law, LLP

(57) ABSTRACT

The present disclosure relates to a communication method and system for converging a 5th-Generation (5G) communication system for supporting higher data rates beyond a 4th-Generation (4G) system with a technology for Internet of Things (IoT). A method performed by a user equipment (UE) in a wireless network, the method comprising: establishing a communication with an application function (AF) server using a first authentication and key management for applications (AKMA) application key ($K_{AF}$); receiving a message over the established communication from the AF server, the message indicating that a lifetime of the first $K_{AF}$ has expired; and configuring a back-off flag in the UE to optimize an AKMA key refresh mechanism in the wireless network in response to receiving the message, wherein the back-off flag prevents a request for a first AKMA anchor key ($K_{AKMA}$) until a fresh primary authentication is performed.

6 Claims, 6 Drawing Sheets

(56) References Cited

OTHER PUBLICATIONS

Ericsson "AKMA Architecture discussion," S3-201049, AKMA Architecture discussion, May 1, 2020.
Huawei et al. "Kakma and Kakma ID derivation at the AUSF side," S3-200716, 3GPP TSG-SA3 Meeting #98Bis-e, Apr. 3, 2020.
Samsung et al. "Handling of KAUSF upon successful primary authentication," S3-203251, 3GPP TSG-SA3 Meeting #101-e, Oct. 30, 2020.
China Mobile "Discussion and working assumption on AKMA open issues," S3-201146, 3GPP TSG-SA3 Meeting #99-e, May 1, 2020.
International Search Report and written opinion dated Mar. 24, 2022, Issued International Application No. PCT/KR2021/019734.
ZTE, Discussion on KAF update, 3GPP TSG-SA3 Meeting #100e, S3-201682, Aug. 2020.
ZTE, Kaf lifetime expiration in clause 5.2, 3GPP TSG-SA3 Meeting #101e, S3-202904, Nov. 2020.
ZTE, Kaf update in clause 5.2 and 6.4.3, 3GPP TSG-SA3 Meeting #100e, S3-201683, Aug. 2020.
Huawei et al., Adding details of AKMA application key generation in the UE, 3GPP TSG-SA3 Meeting #101e, Nov. 2020.
3rd Generation Partnership Project, Technical Specification Group Services and System Aspects, Study on the security aspects of the next generation system (Release 14), 3GPP TR 33.899 V1.3.0, Aug. 2017.
Extended European Search Report dated Mar. 19, 2024, issued in European Application No. 21915678.3-1218.
S3-190923, Study on authentication and key management for applications; based on 3GPP credential in 5G (Release 16), 3GPP TR 33.835 V0.4.0, Mar. 2019.

\* cited by examiner

METHOD AND SYSTEM FOR OPTIMIZING AKMA KEY REFRESH MECHANISM IN WIRELESS NETWORK

CROSS-REFERENCE TO RELATED APPLICATION(S)

This application is based on and claims priority under 35 U.S.C. § 119(a) of an Indian provisional patent application Serial number 202041056989, filed on Dec. 29, 2020, in the Indian Intellectual Property Office, and of an Indian complete patent Application Serial number 202041056989, filed on Nov. 22, 2021, in the Indian Intellectual Property Office, the disclosure of each of which is incorporated by reference herein in its entirety.

BACKGROUND

1. Field

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (COMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access(NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

The disclosure relates to authentication mechanisms in a wireless network. More particularly, the disclosure relates to a method and system for optimizing an Authentication and Key Management for Applications (AKMA) key refresh mechanism in the wireless network.

2. Description of Related Art

In Release-17, 3rd Generation Partnership Project (3GPP) system has specified an AKMA feature, which allows third-party applications to use 3GPP credentials for secure communication between a User Equipment (UE) and application servers.

FIG. 1 shows an existing AKMA procedure (e.g., AKMA key generation and distribution among the 3GPP system) as stated in 3GPP Technical Specification (TS) 33.535 according to the related art.

Referring to FIG. 1, at operation S101, the UE (10) initiates a primary authentication with an Authentication Server Function (AUSF) (20A). After successful primary authentication of a user of the UE (10) (e.g., a Universal Mobile Telecommunications Service (UMTS) Subscriber Identity Module (USIM)), the AUSF (20A) and the UE (10) (e.g., Mobile equipment hosting USIM) derives an AKMA anchor key ($K_{AKMA}$) and an AKMA Key Identifier (A-KID) from an AUSF key (KAUSF). At operation S102, the AUSF (20A) registers the A-KID, the KAKMA, and a Subscription Permanent Identifier (SUPI) into an AKMA Anchor Function (AAnF) server (20B).

At operation S103, when the UE (10) wants to access an application hosted by an Application Function (AF) server (20C), the UE (10) generates an AKMA Application Key (KAF) using the KAKMA and an AF-Identity (e.g., Fully Qualified Domain Name (FQDN)). The AF-Identity may be pre-configured in the UE (10). The 3GPP TS 33.535 defines a key derivation function for the KAF. At operation S104, the UE (10) sends a request to the AF server (20C) to access the application over a Ua* interface, and the UE (10) provides the A-KID to the AF server (20C). At operation S105, on a network side (i.e., the AF server (20C)), the AF server (20C) then requests the AAnF server (20B) to provide the KAF. The AF server (20C) provides its identity (e.g., FQDN) and the received A-KID to the AAnF server (20B).

At operations S106, S107, and S108, the AAnF server (20B) then generates the KAF using the KAKMA and the AF-Identity (e.g., FQDN), and provides the same (i.e., KAF and key lifetime) to the AF server (20C). Thus, both the UE (10) and the AF server (20C) now hold the KAF, which can be used to protect communication over the Ua* interface. The AF server (20C) is an anchor for 3rd party application(s) and interfaces with 3GPP core (e.g., the AAnF server (20B)) either directly (when the AF server (20C) is hosted by an operator itself), or indirectly via a Network Exposure Function (NEF).

In the existing AKMA procedure, the AAnF server (20B) provides the KAF for a limited key lifetime. After the expiry of the KAF, the AF server (20C) revokes UE's access to the application (e.g., third-party applications) and communicates the same over the Ua* interface. Further, the application in the UE (10) requests an AKMA layer in the UE (10) to provide a new KAF. However, as indicated in the 3GPP TS 33.535, no new KAF can be provided if none of the inputs to key derivation function have changed. The only way the new KAF can be generated is if a new KAKMA is available. This triggers the AKMA layer in the UE (10) to send a request to a non-access stratum (NAS) layer to provide the new KAKMA.

However, as described in FIG. 1, the new KAKMA gets generated only if a new primary authentication has taken place. If no new primary authentication has taken place, the UE (10) (e.g., the NAS layer of the UE (10)) rejects the request for the new KAKMA, and the UE (10) (e.g., the AKMA layer of the UE (10)) correspondingly rejects the application's request for the new KAF (e.g., an application layer (upper layers)). However, the application layer of the UE (10) will continue to request new keys (e.g., new KAF) from the AKMA layer, which in turn will continue to request new keys from the NAS layer. This leads to unnecessary wastage of processing resources in the UE (10).

Another problem with the existing AKMA procedure is that when the KAF lifetime expires, then the AF server (20C) is supposed to reject the UE's access to the application and wait for a new A-KID, so that the AF server (20C) can request the new KAF from the AAnF server (20B). However, if the AF server (20C) sends a request to the AAnF server (20B) with an old A-KID, the AAnF server (20B) may end up giving the AF server (20C) with the old KAF. This results in the re-use of old KAF for the Ua* interface, which is not a good security practice.

Another problem with the existing AKMA procedure is that when the KAF refresh over the Ua* interface is supported, a wireless network (e.g., 5GC) is not in control of the KAF refresh, resulting in autonomous key refresh without the wireless network involvement (e.g., 5GC). As per existing methods, if the Ua* interface/protocol supports key refresh, then the key refresh is performed independently, any number of times; which leads to an issue of exploiting subscription credential(s) in 5G systems (once the key is provided to the AF server (20C), the wireless network is unaware of whether a service is still provided using the key (e.g., old key) provided by the wireless network or using a refreshed key) and causes issues with a lawful interception which is part of regulatory requirements in certain regions.

Thus, it is desired to provide a useful alternative for optimizing an AKMA key refresh mechanism in the wireless network.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a flag, by an Authentication and Key Management for Applications (AKMA) entity (e.g., AKMA layer) of a User Equipment (UE), in the UE when a non-access stratum (NAS) entity of the UE rejects a request for a new KAKMA. The request for the new KAKMA received from the AKMA entity, which allows the UE to reject a new KAF request at the AKMA entity itself, and no request is sent to the NAS entity to provide the new KAKMA. If a new primary authentication is performed later for any reason, the new KAKMA and a new A-KID are produced by a wireless network. This causes the NAS entity to send a signal to the AKMA entity to reset the flag. As a result, the AKMA entity can now request the NAS entity to deliver the new KAKMA and the new A-KID, which can then be utilized to generate the new KAF. As a result of configuring the flag, the UE saves processing resources and battery life by avoiding a step of requesting for the new KAKMA to the NAS entity until the fresh primary authentication is done by the wireless network.

Another aspect of the disclosure is to store, by an AKMA Anchor Function (AAnF) server, an AF-Identity (AF-ID) (e.g., a Fully Qualified Domain Name (FQDN)) in a database of the AAnF server for which the KAF has already been generated and provided to an Application Function (AF) server. Where the AF server sends a request to the AAnF server to provide the KAF after establishing a Ua* communication with the UE. The request includes the A-KID received from the UE and the AF-ID (AF-FQDN) of the AF server. As a result, if the AAnF server receives the same request for the KAF (In other words, the AAnF server compares the received request to the database and determines whether the database matches with the received request) then the AAnF server rejects the received request from the AF server, especially if it is received after the lifetime expiry. This way, a malicious AF cannot utilize a stale KAF, hence avoiding security concerns, and/or if the AF server sends the request to the AAnF server with an old A-KID, the AAnF server rejects the request. This avoids reusing an old KAF for the Ua* interface, which is a good security practice.

Another aspect of the disclosure is to indicate, by a Public Land Mobile Network (PLMN), whether the KAF refresh can be performed by the UE and the AF to the UE and/or to the AF. The indication/configuration includes information on a refresh policy/parameters like a number of re-fresh allowed and lifetime for a re-freshened KAF, etc.

Additional aspects will be set forth in part in the description which follows and, in part, will be apparent from the description, or may be learned by practice of the presented embodiments.

In accordance with an aspect of the disclosure, a method for optimizing an Authentication and Key Management for Applications (AKMA) key refresh mechanism in a wireless network is provided. The method includes establishing, by a User Equipment (UE), communication (e.g., Ua* communication) with an Application Function (AF) server using an AKMA Application Key (KAF). Further, the method includes receiving, by the UE, a message over the established communication from the AF server, where the message indicates that a lifetime of the KAF has expired. Further, the method includes configuring, by the UE, a back-off flag in the UE to optimize the AKMA key refresh mechanism in the wireless network in response to receiving the message, where the back-off flag prevents a request for a new AKMA Anchor Key (KAKMA) until a fresh primary authentication is performed.

In an embodiment, where configuring, by the UE, the back-off flag in the UE to optimize the AKMA key refresh mechanism in the wireless network in response to receiving the message, where the back-off flag prevents the request for the new KAKMA until the fresh primary authentication is performed includes receiving, by an AKMA entity of the UE, a request for generating a new KAF and a new AKMA Key Identifier (A-KID) from an application entity of the UE to access an application hosted by the AF server in response to receiving the message. Further, the method includes receiving, by a non-access stratum (NAS) entity of the UE, a request for the new KAKMA from the AKMA entity of the UE. Further, the method includes determining, by NAS entity of the UE, whether a fresh primary authentication is performed. Further, the method includes sending a reject message to the AKMA entity of the UE in response to determining that the fresh primary authentication is not performed, where the AKMA entity of the UE sets the back-off flag which prevents a new request for the new KAKMA until the fresh primary authentication is performed. Further, the method includes sending the new KAKMA to the AKMA entity of the UE and sending the new KAF and the new A-KID to the application entity of the UE in response to determining that the fresh primary authentication is performed, where the AKMA entity of the UE resets the back-off flag.

In an embodiment, where establishing, by the UE, the communication with the AF server using the KAF includes performing, by the UE, a primary authentication with an Authentication Server Function (AUSF). Further, the method includes generating, by the UE, a KAKMA and an A-KID from an AUSF key (KAUSF). Further, the method includes generating, by the UE, the KAF using the KAKMA and an AF-Identity (AF-ID) to access an application hosted by the AF server. Further, the method includes establishing, by the UE, the communication with the AF server to access the application hosted by the AF server, where the UE sends the A-KID to the AF server over the established communication.

In an embodiment, the AUSF derives the KAKMA and the A-KID from the KAUSF, and where the AUSF registers the KAKMA, the A-KID, and Subscription Permanent Identifier (SUPI) into an AKMA Anchor Function (AAnF) server.

In an embodiment, the method includes receiving, by the AAnF server, a request to provide the KAF from the AF server in response to establish the communication with the UE, where the message includes the A-KID and the AF-ID. Further, the method includes generating, by the AAnF server, the KAF using the A-KID and the AF-ID. Further, the method includes sending, by the AAnF server, the KAF, and a key lifetime (e.g., 5 seconds) to the AF server to establish protected communication with the UE using the KAF. Further, the method includes storing, by the AAnF server, the AF-ID in a database for which the KAF has already been generated. Further, the method includes optimizing, by the AAnF server, the AKMA key refresh mechanism based on the stored AF-ID.

In an embodiment, the method further includes receiving, by the AAnF server, a request to provide the KAF from the AF server, where the message includes the A-KID and the AF-ID. Further, the method includes determining, by the AAnF server, whether the requested KAF and the corresponding AF-ID are stored in the database. Further, the method includes sending a reject message to the AF server in response to determining that the requested KAF and the corresponding AF-ID are stored in the database and the key lifetime has expired. Further, the method includes sending the new KAF and corresponding the key lifetime to the AF server to establish protected communication with the UE using the new KAF in response to determining that the requested KAF and the corresponding AF-ID is not stored in the database, where the AAnF server sends the new KAF and the key lifetime to the AF server when a fresh primary authentication is performed.

In an embodiment, the method includes indicating, by a Unified Data Management (UDM) server, whether a KAF refresh performed by the UE and/or the AF is allowed over the established communication, where the indication includes a plurality of refreshment parameters.

In an embodiment, the UDM server provides configuration (policy) whether AKMA Anchor keys can be refreshed for the UE, where the configuration is based on a service type and/or an AF-ID and/or an application type, and/or a network type.

In an embodiment, the UDM server provides the configuration to the UE using a UE parameters update using a UDM control plane procedure and/or as part of a registration procedure.

In an embodiment, the UE is pre-configured with an authorization policy on the KAF refresh.

In an embodiment, the plurality of refreshment parameters includes a number of re-fresh allowed and/or a lifetime for a re-refreshed KAF.

In accordance with another aspect of the disclosure, a method for optimizing the AKMA key refresh mechanism in the wireless network is provided. The method includes receiving, by the AAnF server, the request to provide the KAF from the AF server in response to establish the communication with the UE, where the message includes the A-KID and the AF-ID. Further, the method includes generating, by the AAnF server, the KAF using the A-KID and the AF-ID. Further, the method includes sending, by the AAnF server, the KAF, and the key lifetime to the AF server to establish protected communication with the UE using the KAF. Further, the method includes storing, by the AAnF server, the AF-ID in the database for which the KAF has already been generated. Further, the method includes optimizing, by the AAnF server, the AKMA key refresh mechanism based on the stored AF-ID.

In accordance with another aspect of the disclosure, a method for optimizing the AKMA key refresh mechanism in the wireless network is provided. The method includes indicating, by the UDM server, whether the KAF refresh performed by the UE and/or the AF is allowed over the established communication, where the indication includes the plurality of refreshment parameters.

In accordance with another aspect of the disclosure, a UE for optimizing the AKMA key refresh mechanism in the wireless network is provided. The UE includes an AKMA controller coupled with a processor and a memory. The AKMA controller establishes the communication with the AF server using the KAF. Further, the AKMA controller receives the message over the established communication from the AF server, where the message indicates that the lifetime of the KAF has expired. Further, the AKMA controller configures the back-off flag in the UE to optimize the AKMA key refresh mechanism in the wireless network in response to receiving the message, where the back-off flag prevents the request for the new KAKMA until the fresh primary authentication is performed.

In accordance with another aspect of the disclosure, an AAnF for optimizing the AKMA key refresh mechanism in the wireless network is provided. The AAnF includes an AKMA controller coupled with a processor and memory. The AKMA controller receives the request to provide the KAF from the AF server in response to establish the communication with the UE, where the message includes the A-KID and the AF-ID. Further, the AKMA controller generates the KAF using the A-KID and the AF-ID. Further, the AKMA controller sends the KAF, and the key lifetime to the AF server to establish protected communication with the UE using the KAF. Further, the AKMA controller stores the AF-ID in a database for which the KAF has already been generated. Further, the AKMA controller optimizes the AKMA key refresh mechanism based on the stored AF-ID.

In accordance with another aspect of the disclosure, a UDM for optimizing the AKMA key refresh mechanism in the wireless network is provided. The UDM includes an AKMA controller coupled with a processor and memory. The AKMA controller indicates whether the KAF refresh performed by the UE and/or the AF is allowed over the established communication, where the indication includes the plurality of refreshment parameters.

In accordance with another aspect of the disclosure, a method performed by a user equipment (UE) in a wireless network, the method comprising: establishing a communication with an application function (AF) server using a first authentication and key management for applications (AKMA) Application Key (KAF); receiving a message over the established communication from the AF server, the message indicating that a lifetime of the first KAF has expired; and configuring a back-off flag in the UE to optimize an AKMA key refresh mechanism in the wireless network in response to receiving the message, wherein the back-off flag prevents a request for a first AKMA anchor key (KAKMA) until a fresh primary authentication is performed.

In accordance with another aspect of the disclosure, a method performed by an authentication and key management for applications (AKMA) anchor function (AAnF) server in a wireless network, the method comprising: receiving a message requesting to provide a first AKMA application key (KAF) from an application function (AF) server in response to establishing a communication with a User Equipment (UE), the message comprising an AKMA key identifier (A-KID) and an AF-identity (AF-ID); generating the first KAF using the A-KID and the AF-ID; sending the first KAF and a lifetime of the first KAF to the AF server to establish a protected communication with the UE using the first KAF; storing the AF-ID in a database for which the first KAF has been generated; and optimizing a AKMA key refresh mechanism based on the stored AF-ID.

In accordance with another aspect of the disclosure, a method performed by a unified data management (UDM) server in a wireless network, the method comprising: transmitting information on whether an authentication and key management for applications (AKMA) application key (KAF) refresh performed by at least one of a user equipment (UE) or an application function (AF) server is allowed over an established communication, wherein the information comprises a plurality of refreshment parameters.

In accordance with another aspect of the disclosure, a user equipment (UE) in a wireless network, the UE comprising: a memory; a processor; and an authentication and key management for applications (AKMA) controller, operably connected to the memory and the processor, the AKMA controller being configured to: establish a communication with an application function (AF) server using a first AKMA Application Key (KAF), receive a message over the established communication from the AF server, the message indicating that a lifetime of the first KAF has expired, and configure a back-off flag in the UE to optimize an AKMA key refresh mechanism in the wireless network in response to receiving the message, wherein the back-off flag prevents a request for a first AKMA anchor key (KAKMA) until a fresh primary authentication is performed.

In accordance with another aspect of the disclosure, an authentication and key management for applications (AKMA) anchor function (AAnF) server in a wireless network, the AAnF server comprising: a memory; a processor; and an AKMA controller, operably connected to the memory and the processor, the AKMA controller being configured to: receive a message requesting to provide a first AKMA application key (KAF) from an application function (AF) server in response to establishing a communication with a user equipment (UE), the message comprising an AKMA key identifier (A-KID) and an AF-identity (AF-ID), generate the first KAF using the A-KID and the AF-ID, send the first KAF and a lifetime of the first KAF to the AF server to establish a protected communication with the UE using the first KAF, store the AF-ID in a database for which the first KAF has been generated, and optimize a AKMA key refresh mechanism based on the stored AF-ID.

In accordance with another aspect of the disclosure, a unified data management (UDM) server in a wireless network, the UDM server comprising: a memory; a processor; and an authentication and key management for applications (AKMA) controller, operably connected to the memory and the processor, the AKMA controller being configured to: transmit information on whether an AKMA application key (KAF) refresh performed by at least one of a user equipment (UE) or an application function (AF) server is allowed over an established communication, wherein the information comprises a plurality of refreshment parameters.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
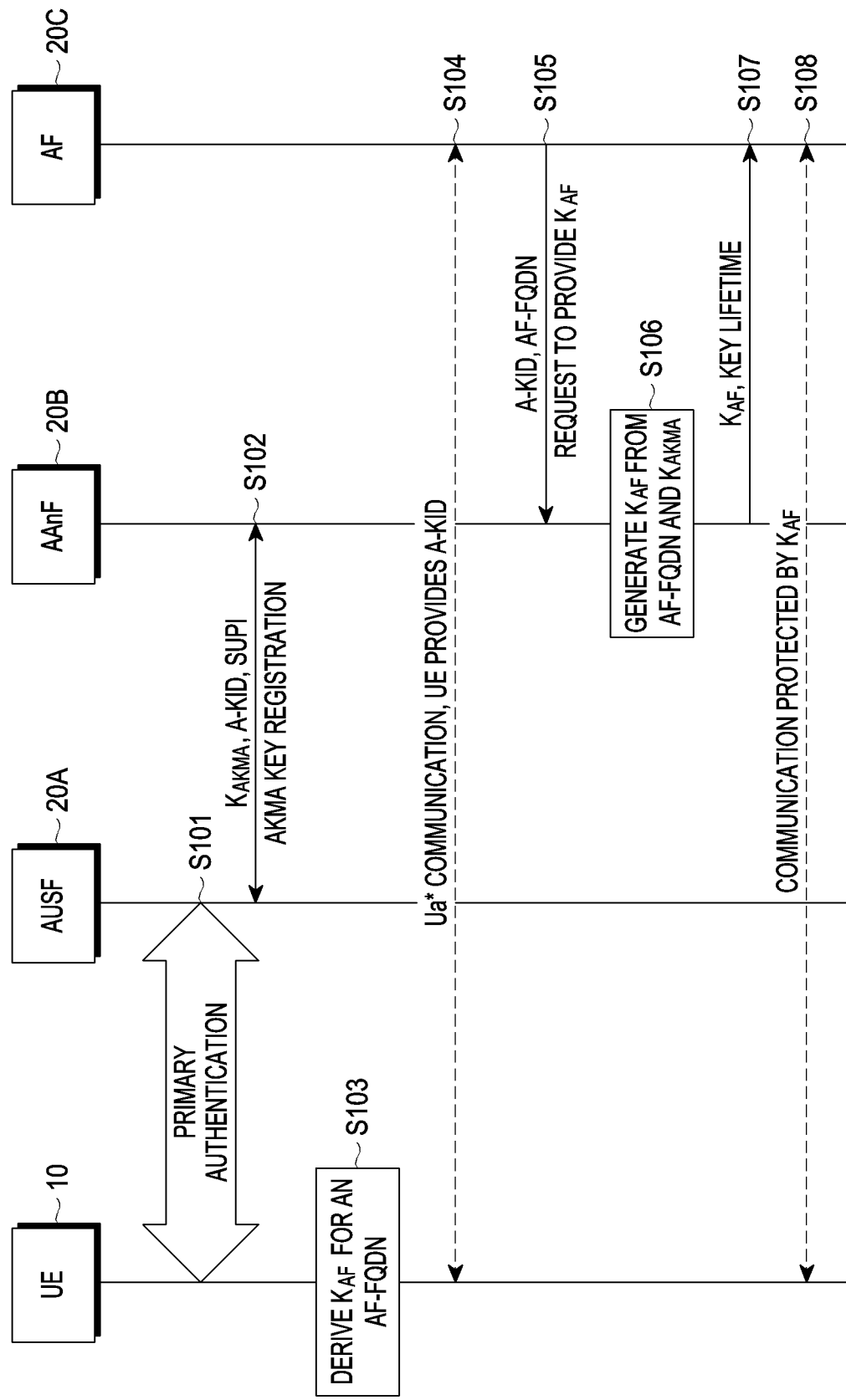
FIG. 1 is a sequence diagram illustrating a method for AKMA procedure as stated in a 3rd Generation Partnership Project (3GPP) Technical Specification (TS) 33.535, according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. Also, the various embodiments described herein are not necessarily mutually exclusive, as some embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

As is traditional in the field, embodiments may be described and illustrated in terms of blocks which carry out a described function or functions. These blocks, which may be referred to herein as managers, units, modules, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits constituting a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are used to help easily understand various technical features and it should be understood that the embodiments presented herein are not limited by the accompanying drawings. As such, the disclosure should be construed to extend to any alterations, equivalents and substitutes in addition to those which are particularly set out in the accompanying drawings.

Throughout this disclosure, the terms Authentication Server Function (AUSF) and "AUSF server" are used interchangeably and mean the same. The terms Authentication and Key Management for Applications (AKMA) Anchor Function (AAnF) and "AAnF server" are used interchangeably and mean the same. The terms Application Function (AF) and "AF server" are used interchangeably and mean the same.

Accordingly, the embodiment herein is to provide a method for optimizing the AKMA key refresh mechanism in a wireless network. The method includes establishing, by a User Equipment (UE), a communication (e.g., Ua* communication) with an AF server using an AKMA Application Key (KAF). Further, the method includes receiving, by the UE, a message over the established communication from the AF server, where the message indicates that a lifetime of the KAF has expired. Further, the method includes configuring, by the UE, a back-off flag in the UE to optimize the AKMA key refresh mechanism in the wireless network in response to receiving the message, where the back-off flag prevents a request for a new AKMA anchor key (KAKMA) until a fresh primary authentication is performed.

Accordingly, the embodiment herein is to provide a method for optimizing the AKMA key refresh mechanism in the wireless network. The method includes receiving, by the AAnF server, the request to provide the KAF from the AF server in response to establish the communication with the UE, where the message includes the A-KID and the AF-ID. Further, the method includes generating, by the AAnF server, the KAF using the A-KID and the AF-ID. Further, the method includes sending, by the AAnF server, the KAF, and the key lifetime to the AF server to establish protected communication with the UE using the KAF. Further, the method includes storing, by the AAnF server, the AF-ID in the database for which the KAF has already been generated. Further, the method includes optimizing, by the AAnF server, the AKMA key refresh mechanism based on the stored AF-ID.

Accordingly, the embodiment herein is to provide a method for optimizing the AKMA key refresh mechanism in the wireless network. The method includes indicating, by the UDM server, whether the KAF refresh performed by the UE and/or the AF is allowed over the established communication, where the indication includes the plurality of refreshment parameters.

Accordingly, the embodiment herein is to provide the UE for optimizing the AKMA key refresh mechanism in the wireless network. The UE includes an AKMA controller coupled with a processor and memory. The AKMA controller establishes the communication with the AF server using the KAF. Further, the AKMA controller receives the message over the established communication from the AF server, where the message indicates that the lifetime of the KAF has expired. Further, the AKMA controller configures the back-off flag in the UE to optimize the AKMA key refresh mechanism in the wireless network in response to receiving the message, where the back-off flag prevents the request for the new KAKMA until the fresh primary authentication is performed.

Accordingly, the embodiment herein is to provide the AAnF for optimizing the AKMA key refresh mechanism in the wireless network. The AAnF includes an AKMA controller coupled with a processor and memory. The AKMA controller receives the request to provide the KAF from the AF server in response to establish the communication with the UE, where the message includes the A-KID and the AF-ID. Further, the AKMA controller generates the KAF using the A-KID and the AF-ID. Further, the AKMA controller sends the KAF, and the key lifetime to the AF server to establish protected communication with the UE using the KAF. Further, the AKMA controller stores the AF-ID in a database for which the KAF has already been generated. Further, the AKMA controller optimizes the AKMA key refresh mechanism based on the stored AF-ID.

Accordingly, the embodiment herein is to provide the UDM for optimizing the AKMA key refresh mechanism in the wireless network. The UDM includes an AKMA controller coupled with a processor and memory. The AKMA controller indicates whether the KAF refresh performed by the UE and/or the AF is allowed over the established communication, where the indication includes the plurality of refreshment parameters.

Unlike existing methods and systems, the proposed method allows an AKMA entity (e.g., AKMA layer) of the UE to set the flag (i.e., back-off flag) in the UE when the non-access stratum (NAS) entity of the UE rejects a request for a new KAKMA. The request for the new KAKMA received from the AKMA entity, which allows it to reject a new KAF request at the AKMA entity itself, and no request is sent to the NAS entity to provide the new KAKMA. If a new primary authentication is performed later for any reason, the new KAKMA and a new A-KID are produced by a wireless network. This causes the NAS entity to send a signal to the AKMA entity to reset the flag. As a result, the AKMA entity can now request the NAS entity to deliver the new KAKMA and the new A-KID, which can then be utilized to generate the new KAF. As a result of configuring the flag, the UE saves processing resources and battery life by avoiding requesting the new KAKMA to the NAS entity until the fresh primary authentication is done by the wireless network.

Unlike existing methods and systems, the proposed method allows the AAnF server is to store an AF-Identity (AF-ID) (e.g., a Fully Qualified Domain Name (FQDN)) in a database of the AAnF server for which the KAF has already been generated and provided to an AF server. Where the AF server sends a request to the AAnF server to provide the KAF after establishing the communication (e.g., Ua* interface) with the UE. The request includes the A-KID received from the UE and the AF-ID (AF-FQDN) of the AF server. As a result, if the AAnF server receives the same request for the KAF (In other words, the AAnF server compares the received request to the database and determines whether the database matches with the received request) then the AAnF server rejects the received request from the AF server, especially if it is received after the key lifetime expiry. This way, a malicious AF cannot utilize stale KAF, hence avoiding security concerns, and/or if the AF server sends the request to the AAnF server with an old A-KID, the AAnF server rejects the request. This avoids reusing an old KAF for the Ua* interface, which is a good security practice.

Unlike existing methods and systems, the proposed method allows the UDM/Public Land Mobile Network (PLMN) to indicate whether the KAF refresh can be performed by the UE and the AF to the UE and/or to the AF. The indication/configuration includes information on a refresh policy/parameters like a number of re-fresh allowed and lifetime for a re-freshened KAF, etc.

Referring now to the drawings and more particularly to FIGS. 2A to 2C, 3A, 3B, and 4, where similar reference characters denote corresponding features consistently throughout the figures, there are shown preferred embodiments.

Figure 2A:
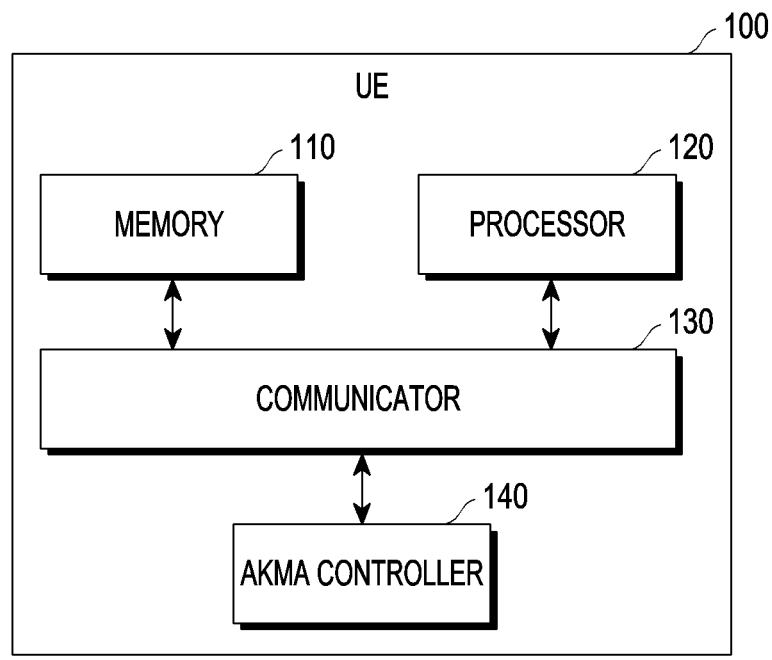
FIG. 2A illustrates a block diagram of a User Equipment (UE) for optimizing Authentication and Key Management for Applications (AKMA) key refresh mechanism in a wireless network, according to an embodiment of the disclosure.

FIG. 2A illustrates a block diagram of a User Equipment (UE) (100) for optimizing Authentication and Key Management for Applications (AKMA) key refresh mechanism in a wireless network, according to an embodiment of the disclosure. Examples of the UE (100) include, but are not limited to a smartphone, a tablet computer, a Personal Digital Assistance (PDA), an Internet of Things (IoT) device, a wearable device, etc. Furthermore, the UE (100) includes an application entity (101), an AKMA entity (102), and a NAS entity (103) (not shown in FIG. 2A).

In an embodiment, the UE (100) includes a memory (110), a processor (120), a communicator (130), and an AKMA controller (140).

In an embodiment, the memory (110) is configured to store an AKMA Application Key (KAF), an AKMA Key Identifier (A-KID), a lifetime of the KAF, and configuration of a back-off flag. The memory (110) stores instructions to be executed by the processor (120). The memory (110) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (110) may, in some examples, be considered a non-transitory storage medium. The term "non-transitory" may indicate that the storage medium is not embodied in a carrier wave or a propagated signal. However, the term "non-transitory" should not be interpreted that the memory (110) is non-movable. In some examples, the memory (110) can be configured to store larger amounts of information than the memory. In certain examples, a non-transitory storage medium may store data that can, over time, change (e.g., in Random Access Memory (RAM) or cache). The memory (110) can be an internal storage unit or it can be an external storage unit of the UE (100), a cloud storage, or any other type of external storage.

The processor (120) communicates with the memory (110), the communicator (130), and the AKMA controller (140). The processor (120) is configured to execute instructions stored in the memory (110) and to perform various processes. The processor (120) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (130) is configured for communicating internally between internal hardware components and with external devices (e.g., AAnF server, UDM, server, etc.) via one or more networks (e.g., Radio technology). The communicator (130) includes an electronic circuit specific to a standard that enables wired or wireless communication.

The AKMA controller (140) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (140) establishes communication with an Application Function (AF) server (200C) using an AKMA Application Key (KAF). Further, the AKMA controller (140) receives a message over the established communication from the AF server (200C), where the message indicates that a lifetime of the KAF has expired. Further, the AKMA controller (140) configures a back-off flag in the UE (100) to optimize the AKMA key refresh mechanism in the wireless network in response to receiving the message, where the back-off flag prevents a request for a new AKMA anchor key (KAKMA) until a fresh primary authentication is performed.

Further, the AKMA controller (140) receives a request for generating a new KAF and a new AKMA Key Identifier (A-KID) from an application entity (101) of the UE (100) to access an application hosted by the AF server (200C) in response to receiving the message. Further, the AKMA controller (140) receives a request for the new KAKMA from the AKMA entity (102) of the UE (100). Further, the AKMA controller (140) determines whether a fresh primary authentication is performed. Further, the AKMA controller (140) sends a reject message to the AKMA entity (102) of the UE (100) in response to determining that the fresh primary authentication is not performed, where the AKMA entity (102) of the UE (100) sets the back-off flag which prevents a new request for the new KAKMA until the fresh primary authentication is performed. Further, the AKMA controller (140) sends the new KAKMA to the AKMA entity (102) of the UE (100) and sends the new KAF and the new A-KID to the application entity (101) of the UE (100) in response to determining that the fresh primary authentication is performed, where the AKMA entity (102) of the UE (100) resets the back-off flag.

Further, the AKMA controller (140) performs a primary authentication with an Authentication Server Function (AUSF) (200A). Further, the AKMA controller (140) generates the KAKMA and the A-KID from an AUSF key (KAUSF). Further, the AKMA controller (140) generates the KAF using the KAKMA and an AF-Identity (AF-ID) to access an application hosted by the AF server (200C). Further, the AKMA controller (140) establishes the communication with the AF server (200C) to access the application hosted by the AF server (200C), where the UE (100) sends the A-KID to the AF server (200C) over the established communication. The AUSF (200A) derives the KAKMA and the A-KID from the KAUSF, and where the AUSF (200A) registers the KAKMA, the A-KID, and Subscription Permanent Identifier (SUPI) into an AKMA Anchor Function (AAnF) server (200B).

Although the FIG. 2A shows various hardware components of the UE (100) but it is to be understood that other embodiments are not limited thereon. In other embodiments, the UE (100) may include a greater or lesser number of components. Further, the labels or names of the components are used only for illustrative purpose and does not limit the scope of the disclosure. One or more components can be combined to perform the same or substantially similar function to optimize the AKMA key refresh mechanism in the wireless network.

Figure 2B:
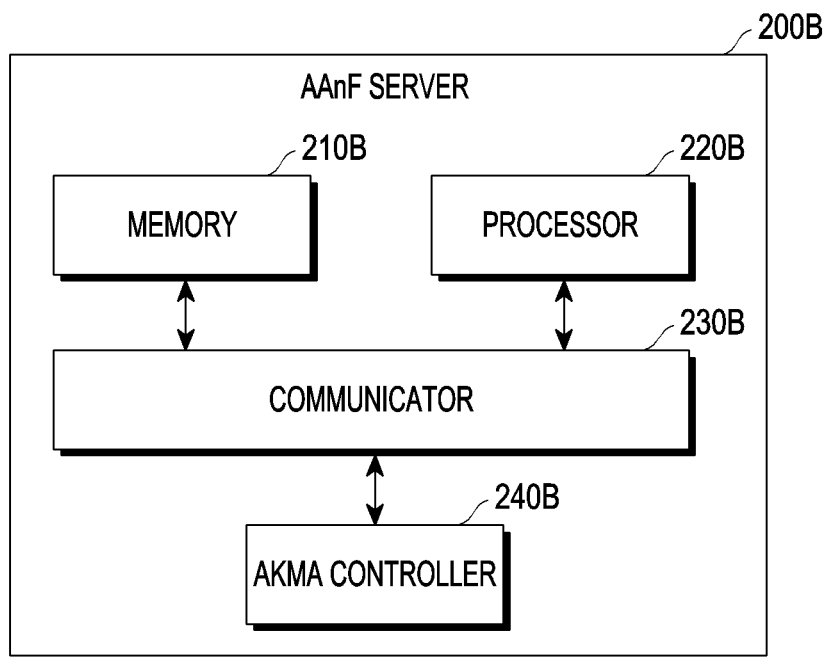
FIG. 2B illustrates a block diagram of an AKMA Anchor Function (AAnF) server for optimizing the AKMA key refresh mechanism in the wireless network, according to an embodiment of the disclosure.

FIG. 2B illustrates a block diagram of the AAnF server (200B) for optimizing the AKMA key refresh mechanism in the wireless network, according to an embodiment of the disclosure.

Referring to FIG. 2B, in an embodiment, the AAnF server (200B) includes a memory (210B), a processor (220B), a communicator (230B), and an AKMA controller (240B).

In an embodiment, the memory (210B) is configured to store the KAKMA, the KAF, the A-KID, and the lifetime of the KAF. The memory (210B) stores instructions to be executed by the processor (220B). The memory (210B) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210B) may, in some examples, be considered a non-transitory storage medium. The term "non-transitory" may indicate that the storage medium is not embodied in a carrier wave or a propagated signal. However, the term "non-transitory" should not be interpreted that the memory (210B) is non-movable. In some examples, the memory (210B) can be configured to store larger amounts of information than the memory. In certain examples, a non-transitory storage medium may store data that can, over time, change (e.g., in Random Access Memory (RAM) or cache). The memory (210B) can be an internal storage unit or it can be an external storage unit of the AAnF server (200B), a cloud storage, or any other type of external storage.

The processor (220B) communicates with the memory (210B), the communicator (230B), and the AKMA controller (240B). The processor (220B) is configured to execute instructions stored in the memory (210B) and to perform various processes. The processor (220B) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230B) is configured for communicating internally between internal hardware components and with external devices (e.g., UE, UDM, server, etc.) via one or more networks (e.g., Radio technology). The communicator (230B) includes an electronic circuit specific to a standard that enables wired or wireless communication.

The AKMA controller (240B) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (240B) receives a request to provide the KAF from the AF server (200C) in response to establish the communication with the UE (100), where the message includes the A-KID and the AF-ID. Further, the AKMA controller (240B) generates the KAF using the A-KID and the AF-ID. Further, the AKMA controller (240B) sends the KAF, and the key lifetime to the AF server (200C) to establish protected communication with the UE (100) using the KAF. Further, the AKMA controller (240B) stores the AF-ID in a database (i.e., memory (210B)) for which the KAF has already been generated. Further, the AKMA controller (240B) optimizes the AKMA key refresh mechanism based on the stored AF-ID.

Further, the AKMA controller (240B) receives a request to provide the KAF from the AF server (200C), where the message includes the A-KID and the AF-ID. Further, the AKMA controller (240B) determines whether the requested KAF and the corresponding AF-ID are stored in the database. Further, the AKMA controller (240B) sends a reject message to the AF server (200C) in response to determining that the requested KAF and the corresponding AF-ID are stored in the database and the key lifetime has expired. Further, the AKMA controller (240B) sends a new KAF and corresponding a key lifetime to the AF server (200C) to establish protected communication with the UE (100) using the new KAF in response to determining that the requested KAF and the corresponding AF-ID is not stored in the database, where the AAnF server (200B) sends the new KAF and the key lifetime to the AF server (200C) when a fresh primary authentication is performed.

Although the FIG. 2B shows various hardware components of the AAnF server (200B) but it is to be understood that other embodiments are not limited thereon. In other embodiments, the AAnF server (200B) may include a greater or lesser number of components. Further, the labels or names of the components are used only for illustrative purpose and does not limit the scope of the disclosure. One or more components can be combined to perform the same or substantially similar function to optimize the AKMA key refresh mechanism in the wireless network.

Figure 2C:
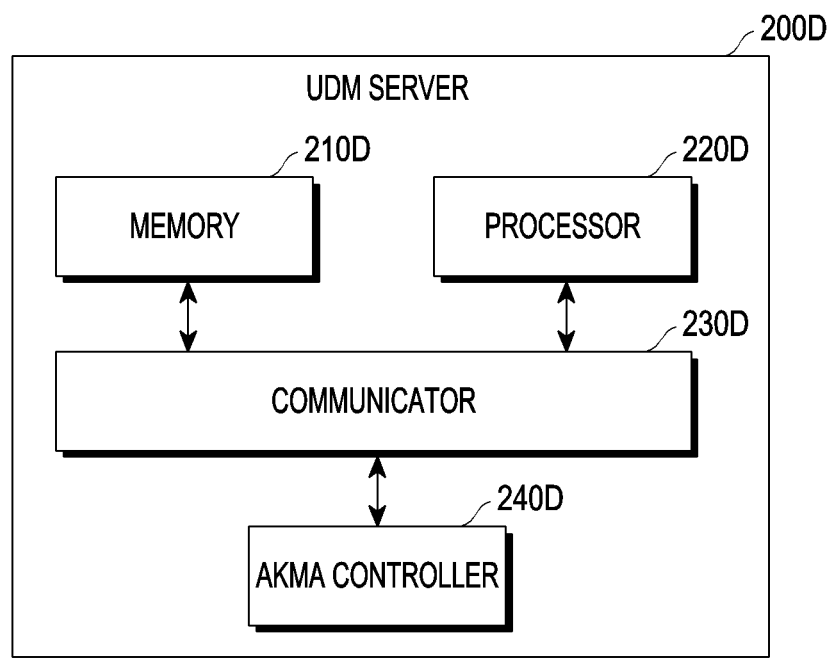
FIG. 2C illustrates a block diagram of a Unified Data Management (UDM) server for optimizing the AKMA key refresh mechanism in the wireless network, according to an embodiment of the disclosure.

FIG. 2C illustrates a block diagram of the UDM server (200D) for optimizing the AKMA key refresh mechanism in the wireless network, according to an embodiment of the disclosure.

Referring to FIG. 2C, in an embodiment, the UDM server (200D) includes a memory (210D), a processor (220D), a communicator (230D), and an AKMA controller (240D).

In an embodiment, the memory (210D) is configured to store the AF-FQDN, the KAF, the A-KID, and the lifetime of the KAF. The memory (210D) stores instructions to be executed by the processor (220D). The memory (210D) may include non-volatile storage elements. Examples of such non-volatile storage elements may include magnetic hard discs, optical discs, floppy discs, flash memories, or forms of electrically programmable memories (EPROM) or electrically erasable and programmable (EEPROM) memories. In addition, the memory (210D) may, in some examples, be considered a non-transitory storage medium. The term "non-transitory" may indicate that the storage medium is not embodied in a carrier wave or a propagated signal. However, the term "non-transitory" should not be interpreted that the memory (210D) is non-movable. In some examples, the memory (210D) can be configured to store larger amounts of information than the memory. In certain examples, a non-transitory storage medium may store data that can, over time, change (e.g., in Random Access Memory (RAM) or cache). The memory (210D) can be an internal storage unit or it can be an external storage unit of the UDM server (200D), a cloud storage, or any other type of external storage.

The processor (220D) communicates with the memory (210D), the communicator (230D), and the AKMA controller (240D). The processor (220D) is configured to execute instructions stored in the memory (210D) and to perform various processes. The processor (220D) may include one or a plurality of processors, maybe a general-purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

The communicator (230D) is configured for communicating internally between internal hardware components and with external devices (e.g., UE, AF, AAnF, server, etc.) via one or more networks (e.g., Radio technology). The communicator (230D) includes an electronic circuit specific to a standard that enables wired or wireless communication.

The AKMA controller (240D) is implemented by processing circuitry such as logic gates, integrated circuits, microprocessors, microcontrollers, memory circuits, passive electronic components, active electronic components, optical components, hardwired circuits, or the like, and may optionally be driven by firmware. The circuits may, for example, be embodied in one or more semiconductor chips, or on substrate supports such as printed circuit boards and the like.

In an embodiment, the AKMA controller (240D) indicates whether a KAF refresh performed by the UE (100) and/or the AF server (200C) is allowed over the established communication, where the indication includes a plurality of refreshment parameters. The UDM server (200D) provides configuration (in other word "policy") whether AKMA Anchor keys can be refreshed for the UE (100), where the configuration is based on a service type and/or the AF-ID and/or an application type and/or a network type. The UDM server (200D) provides the configuration to the UE (100) using a UE parameter update using a UDM control plane procedure and/or as part of a registration procedure. The UE (100) is pre-configured with an authorization policy on the KAF refresh. The plurality of refreshment parameters includes a number of refresh allowed and/or a lifetime for a re-refreshed KAF.

Although the FIG. 2C shows various hardware components of the UDM server (200D) but it is to be understood that other embodiments are not limited thereon. In other embodiments, the UDM server (200D) may include a greater or lesser number of components. Further, the labels or names of the components are used only for illustrative purpose and does not limit the scope of the disclosure. One or more components can be combined to perform the same or substantially similar function to optimize the AKMA key refresh mechanism in the wireless network.

Figure 3A:
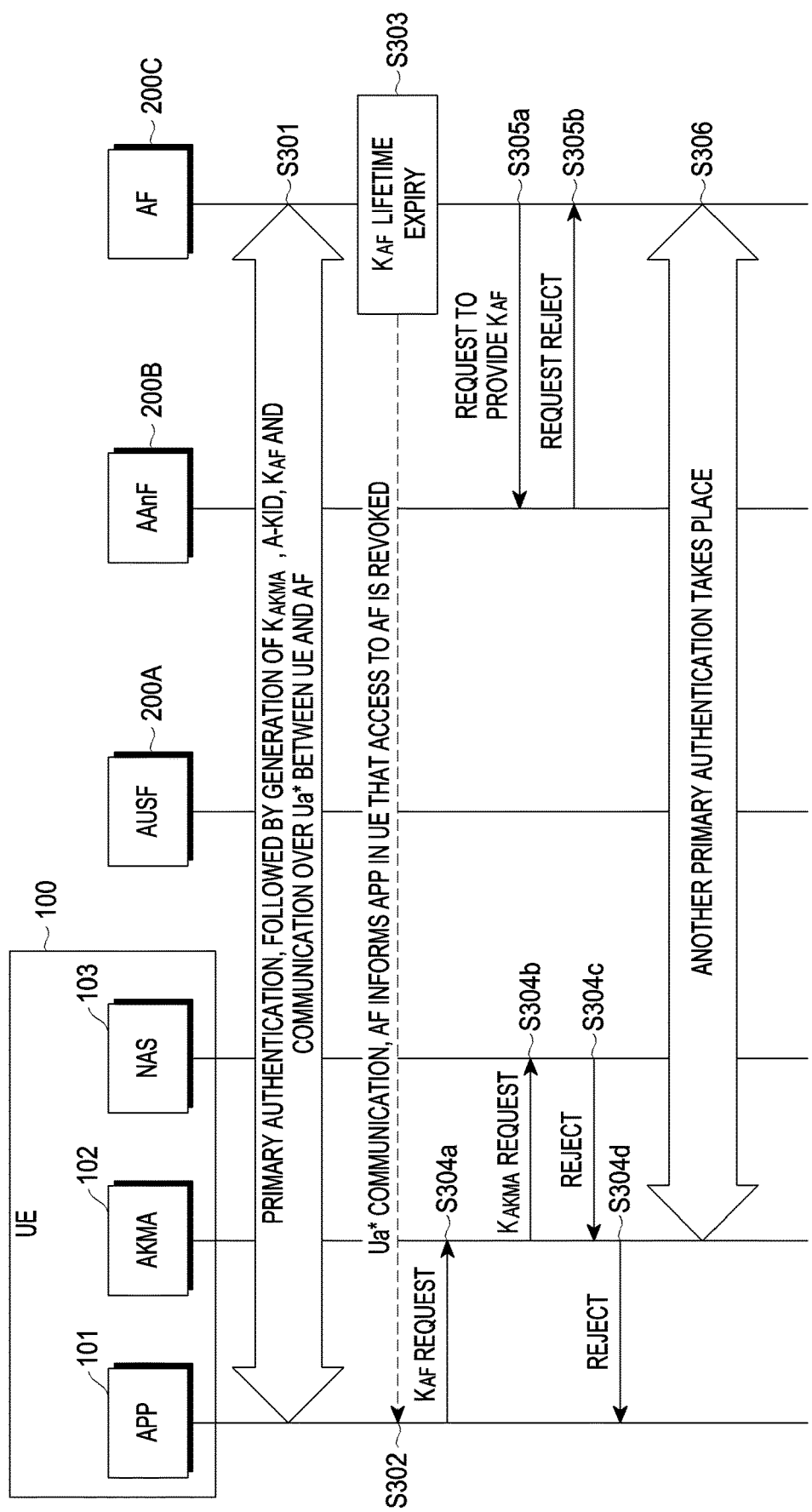
FIGS. 3A and 3B are sequence diagrams illustrating a proposed method for optimizing the AKMA key refresh mechanism by the UE and the AAnF server in the wireless network, according to various embodiments of the disclosure.
Figure 3B:
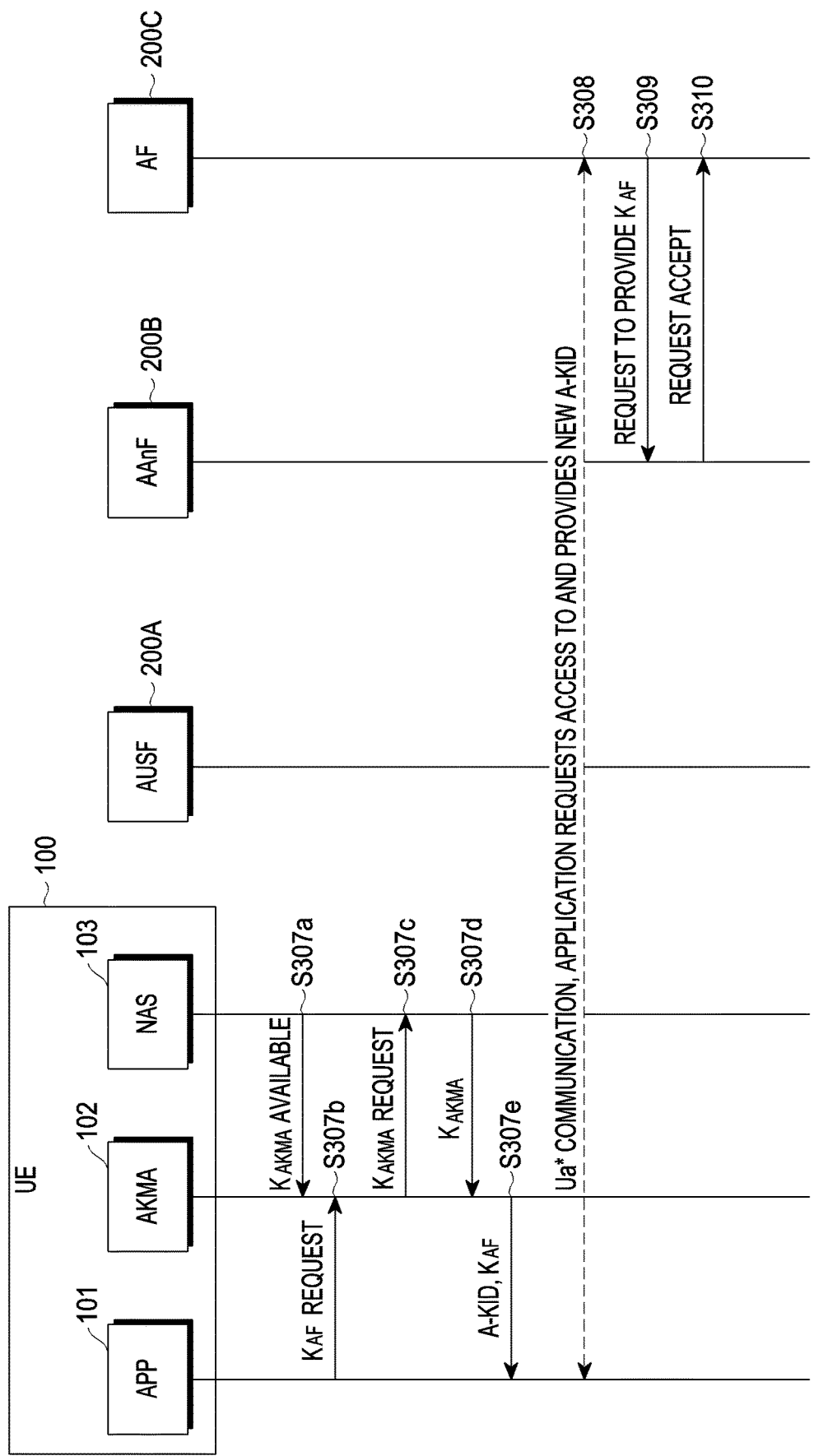

FIGS. 3A and 3B are sequence diagrams illustrating a proposed method for optimizing the AKMA key refresh mechanism by the UE (100) and the AAnF server (200B) in the wireless network, according to various embodiments of the disclosure.

Referring to FIGS. 3A and 3B, at operation S301, the UE (100) registers with the wireless network (e.g., AUSF (200A), AAnF server (200B), etc.), and the UE (100) then performs the primary authentication. Post successful authentication, the KAKMA, and the A-KID are stored in the AAnF server (200B). The UE (100) then generates the KAF and establishes the Ua* communication with the AF server (200C) by providing the A-KID. The AF server (200C) retrieves the KAF from the AAnF server (200B) by providing the AF-Identity (e.g., AF-FQDN) and the A-KID. The AAnF server (200B) also provides the KAF key lifetime. In an embodiment, the AF-Identity is stored in AAnF's UE-Context. This helps the AAnF server (200B) to remember that the KAF has already been provided for a given A-KID/SUPI.

At operations S302 and S303, the AF server (200C) detects that the KAF lifetime expires. The AF server (200C) then informs the application (i.e., application entity (101) or (APP (101)) in the UE (100) that its access to the AF server (200C) is revoked due to key expiry.

At operations S304a, S304b, S304c, and S304d, the application entity (101) requests the AKMA layer (i.e., AKMA entity (102) or (AKMA (102))) within the UE (100) to provide updates on the A-KID and the KAF. This triggers the AKMA entity (102) request to the NAS layer (i.e., NAS entity (103) or NAS (103)) within the UE (100) to provide the new A-KID and the new KAKMA. However, since no new KAKMA is available, the request is rejected by the NAS entity (103). In an embodiment, the NAS entity (103) informs the AKMA entity (102) to "back-off," e.g., by setting the back-off flag, which prevents any new request from the application entity (101), triggering a request to the NAS entity (103).

At operations S305a and S305b, any request by the AF server (200C) for providing the KAF, using the old A-KID, is similarly rejected by the AAnF server (200B), as the AAnF server (200B) had stored the AF-Identity at operation S301. At operation S306, some events in the UE (100) (e.g., UE's mobility)/the network cause (e.g., network policy) the fresh primary authentication to take place, resulting in the generation of a fresh KAKMA in the NAS entity (103), as well as registration of the same by the AUSF (200A) into the AAnF server (200B).

At operations S307a, S307b, S307c, S307d, and S307e, in an embodiment, the NAS entity (103) informs the AKMA entity (102) to reset the back-off flag that was saved in S304c. Now, whenever the UE (100) wishes to access the application again, the application's request for the new KAF & the new A-KID is accepted. On the network side, generation of the new A-KID results in over-writing of old UE-context by the new A-KID. At operations S308, S309, and S310, the UE (100) can now request access to the AF server (200C) over the Ua* communication, which can in turn get updated KAF from the AAnF server (200B).

Figure 4:
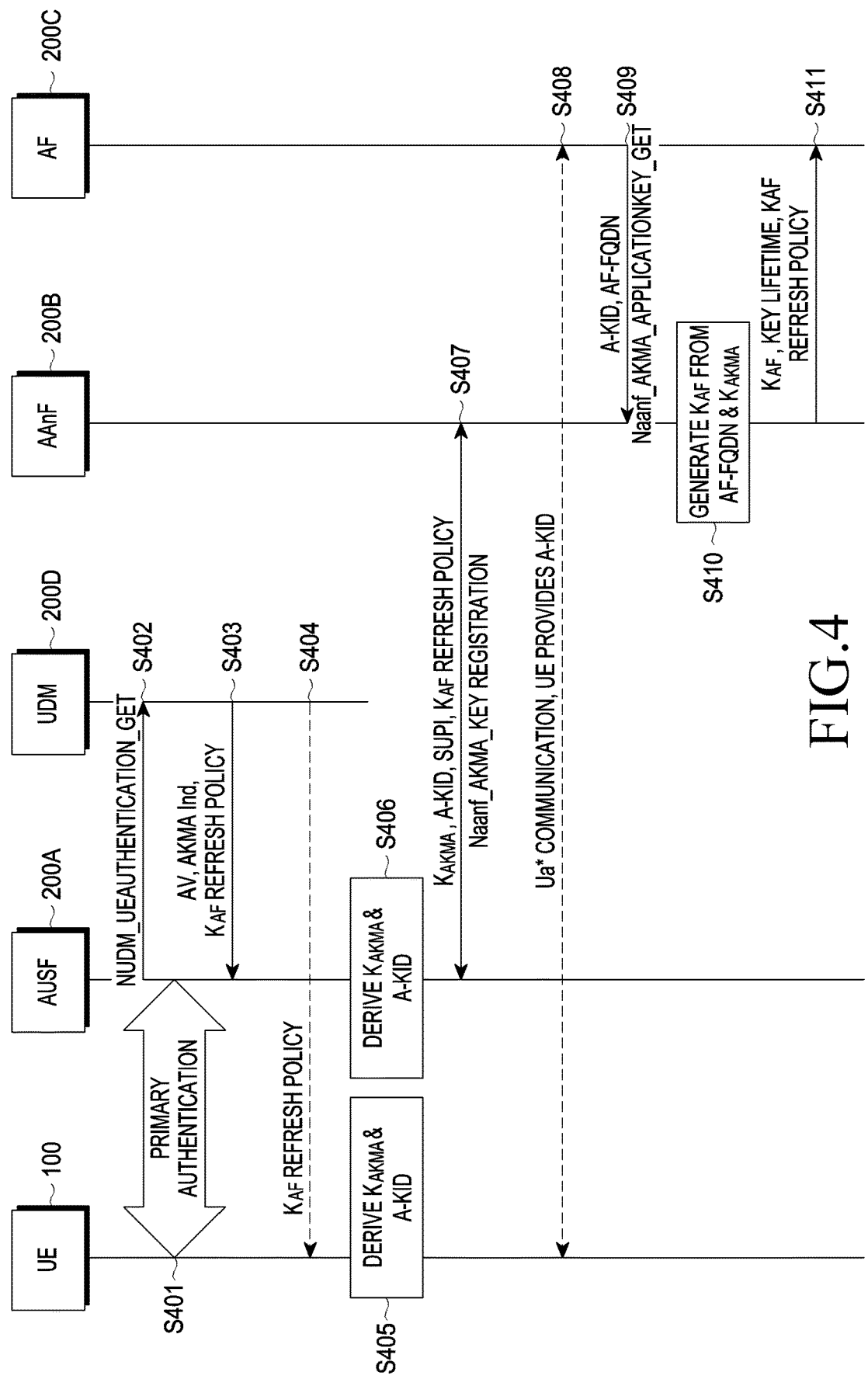
FIG. 4 is a sequence diagram illustrating a proposed method for optimizing the AKMA key refresh mechanism by the UDM server in the wireless network, according to an embodiment of the disclosure.

FIG. 4 is a sequence diagram illustrating a proposed method for optimizing the AKMA key refresh mechanism by the UDM server (200D) in the wireless network, according to an embodiment of the disclosure.

Referring to FIG. 4, at operation S401, the UE (100) registers with the wireless network (e.g., AUSF (200A), AAnF server (200B), etc.), and the UE (100) then performs the primary authentication. At operation S402, during the primary authentication, the AUSF (200A) interacts with the UDM server (200D) in order to fetch authentication information such as subscription credentials (e.g., Authentication and Key Agreement (AKA) Authentication vectors) and an authentication method using a Nudm_UEAuthentication_Get request service operation.

At operations S403 and S404, in response to receiving the Nudm_UEAuthentication_Get request, the UDM server (200D) indicates to the AUSF (200A) whether the AKMA Anchor keys need to be generated for the UE (100). Further, the UDM server (200D) optionally provides information (e.g., configuration/consent/authorization/policy) on whether the KAF refresh is allowed or not, based on a local policy (e.g., regional regulatory policy/requirement/rule) and/or subscription data and/or operator's policy.

In an embodiment, the configuration may be on a service type basis, for example, for Multi-access edge computing (MEC) and Internet of Things (IoT) service refresh is allowed and for other services such as Vehicle-to-Everything (V2X) refresh is not allowed.

In an embodiment, the configuration on authorization/consent may be on the AF-ID basis, for example, the AF server (200C) within a PLMN is allowed to perform the refresh, and the AF servers (200C) providing service outside of the PLMN is not allowed to perform the refresh of the KAF.

In an embodiment, the configuration may be on an application type basis within a service, for example, a location update application of the MEC service can perform the key refresh, whereas for triggering application of the MEC service cannot perform the refresh of the KAF.

In an embodiment, the configuration may be on network type serving the UE (100), for example, for Home Public Land Mobile Network (HPLMN) provided services key refresh is allowed, whereas if it is a roaming network which will serve the UE (100), then performing refresh of the KAF is not allowed (e.g., when the UE (100) is roaming to another network, the policy may state that key refresh is not permitted (e.g., in a different country)).

In an embodiment, the UDM server (200D) provides information (via AUSF (200A) and/or Access and Mobility Management Function (AMF)) on the authorization/consent information/policy on the KAF refresh to the UE (100). The UDM server (200D) provides the information to the UE (100), using UE parameters update via a UDM Control Plane procedure or as part of a registration procedure.

In an embodiment, the UE (100) is pre-configured (in a Universal Mobile Telecommunications Service (UMTS) Subscriber Identity Module (USIM)) with the authorization/consent information/policy on the KAF refresh.

In an embodiment, the AMF provides the information on the authorization/consent information/policy on the KAF refresh to the UE (100). The AMF provides the information to the UE (100), using the NAS procedure (as part of NAS configuration). The AMF is locally configured with the information on the KAF refresh and/or obtained from the UDM server (200D) and/or obtained from a Policy Control Function (PCF).

In an embodiment, the AUSF (200A) provides the information (via AMF) on the authorization/consent information/policy on the KAF refresh to the UE (100). The AUSF (200A) provides the information to the UE (100), as part of the primary authentication procedure.

In an embodiment, the AUSF (200A)/AMF/PCF are configured with the authorization/consent information/policy on the KAF refresh based on the local policy (e.g., regional regulatory policy/requirement/rule) and/or subscription data and/or network/operator's policy.

At operations S405 and S406, when the AUSF (200A) receives the AKMA indication from the UDM server (200D), then the AUSF (200A) stores the KAUSF, and generates the KAKMA and the A-KID from the KAUSF after the primary authentication procedure is successfully completed.

In an embodiment, the AUSF (200A) locally configures the information on whether the KAF refresh is allowed or not, based on the local policy (e.g., regional regulatory policy/requirement/rule) and/or subscription data and/or operator's policy.

In an embodiment, the configuration may be on the service type basis, for example, for the MEC and the IoT service refresh is allowed and for other services like the V2X refresh is not allowed.

In an embodiment, the configuration may be on the authorization/consent may be on the AF-ID basis, for example, the AF server (200C) within the PLMN is allowed to perform refresh, and AFs providing service outside of the PLMN is not allowed to perform the refresh of the KAF.

In an embodiment, the configuration may be on the application type basis within a service, for example, the location update application of the MEC service can perform key refresh, whereas for triggering application of MEC service cannot perform the refresh of the KAF.

In an embodiment, the configuration may be on the network type serving the UE (100), for example, for the HPLMN provided services key refresh is allowed, whereas if it is a roaming network which will serve the UE (100), then performing refresh of the KAF is not allowed.

The UE (100) generates the KAKMA and the A-KID from the KAUSF before initiating communication with the AF server (200C).

Referring to FIG. 4, at operation S407, after the AKMA key material is generated, the AUSF (200A) sends the generated A-KID, and the KAKMA to the AAnF server (200B) together with the SUPI of the UE (100) using a NAAnF_AKMA_KeyRegistration Request service operation. The AAnF server (200B) stores the latest information sent by the AUSF (200A).

In an embodiment, based on the local configuration and/or indication from the UDM server (200D), the AUSF (200A) indicates the authorization/consent information/policy on the KAF refresh to the AAnF server (200B). The AAnF server (200B) stores the information sent by the AUSF (200A).

Referring to FIG. 4, at operations S408 and S409, the UE (100) triggers the request to the AF server (200C) for accessing a particular application, the AF server (200C) sends a NAAnF_AKMA_ApplicationKey_Get request to the UE (100) to obtain the KAF. The request includes the A-KID and the AF-FQDN.

Referring to FIG. 4, at operation S410, the AAnF server (200B) generates the KAF from the AF-FQDN and KAKMA. When the AAnF server (200B) sends a NAAnF_AKMA_ApplicationKey_Get response to the AF server (200C) with the KAF and the KAF expiration time at operation S411, the AAnF server (200B) also includes the authorization/consent information/policy on the KAF refresh to the AF server (200C). Based on the received information/consent/authorization the AF server (200C) performs the KAF refresh if Ua* interface support it. Similarly, the UE (100) optionally verifies whether the KAF refresh is allowed for the service/application/network/AF. Only if allowed, then the UE (100) performs the KAF refresh.

The various actions, acts, blocks, operations, or the like in the FIGS. 3A, 3B, and 4 may be performed in the order presented, in a different order, or simultaneously. Further, in some embodiments, some of the actions, acts, blocks, operations, or the like may be omitted, added, modified, skipped, or the like without departing from the scope of the invention.

The embodiments disclosed herein can be implemented using at least one hardware device and performing network management functions to control the elements.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a user equipment (UE) in a wireless network, the method comprising:
generating a first primary authentication and key management for applications (AKMA) anchor key ($K_{AKMA}$) and performing a first primary authentication with an AKMA anchor function (AAnF) server;
establishing communication with an application function (AF) server using a first AKMA application key ($K_{AF}$) based on the first primary authentication;
receiving, from the AF server over the established communication, a message indicating that a lifetime of the first $K_{AF}$ has expired;
in response to receiving the message from the AF server over the established communication, configuring a back-off flag in the UE to optimize an AKMA key refresh mechanism in the wireless network, wherein the back-off flag prevents a request for a second $K_{AKMA}$ until a second primary authentication is performed; and
in case that the second primary authentication is performed, generating the second $K_{AKMA}$.

2. The method of claim 1, wherein the configuring of the back-off flag comprises:
in response to receiving the message, identifying, using an AKMA entity of the UE, a request for generating a second $K_{AF}$ and a first AKMA key identifier (A-KID) to access an application hosted by the AF server;
identifying, using a non-access stratum (NAS) entity of the UE, the request for the second $K_{AKMA}$ from the AKMA entity of the UE;
determining, using the NAS entity of the UE, whether the second primary authentication is performed; and
performing one of:
in response to determining that the second primary authentication is not performed, transferring a reject message from the NAS entity of the UE to the AKMA entity of the UE, the AKMA entity of the UE setting the back-off flag which prevents a second request for the second $K_{AKMA}$ until the second primary authentication is performed, or
in response to determining that the second primary authentication is performed, transferring the second $K_{AKMA}$ from the NAS entity of the UE to the AKMA entity of the UE, and transferring the second $K_{AF}$ and the first A-KID from the NAS entity of the UE to an application entity of the UE, wherein the AKMA entity of the UE resets the back-off flag.

3. The method of claim 1, wherein the establishing of the communication with the AF server using the first $K_{AF}$ comprises:
performing a primary authentication with an authentication server function (AUSF);
generating a second $K_{AKMA}$ and a second AKMA key identifier (A-KID) from an AUSF key ($K_{AUSF}$);
generating the first $K_{AF}$ using the second $K_{AKMA}$ and an AF-identity (AF-ID) to access an application hosted by the AF server;
establishing the communication with the AF server to access the application hosted by the AF server; and
sending the second A-KID to the AF server over the established communication.

4. A user equipment (UE) in a wireless network, the UE comprising:
a transceiver; and
at least one processor coupled to the transceiver and configured to;
generate a first primary authentication and key management for applications (AKMA) anchor key ($K_{AKMA}$) and perform a first primary authentication with an AKMA anchor function (AAnF) server,
establish communication with an application function (AF) server using a first AKMA application key ($K_{AF}$) based on the first primary authentication,
receive, from the AF server over the established communication, a message indicating that a lifetime of the first $K_{AF}$ has expired,
in response to receiving the message from the AF server over the established communication, configure a back-off flag in the UE to optimize an AKMA key refresh mechanism in the wireless network, wherein the back-off flag prevents a request for a second $K_{AKMA}$ until a second primary authentication is performed, and
in case that the second primary authentication is performed, generate the second $K_{AKMA}$.

5. The UE of claim 4, wherein the AKMA controller is further configured to:
in response to receiving the message, identify, using an AKMA entity of the UE, a request for generating a second $K_{AF}$ and a first AKMA Key Identifier (A-KID) to access an application hosted by the AF server,
identify, using a non-access stratum (NAS) entity of the UE, the request for the second $K_{AKMA}$,
determine, using the NAS entity of the UE, whether the second primary authentication is performed, and
perform one of:
in response to determining that the second primary authentication is not performed, transferring a reject message from the NAS entity of the UE to the AKMA entity of the UE, the AKMA entity of the UE setting the back-off flag which prevents a second request for the second $K_{AKMA}$ until the second primary authentication is performed; or
in response to determining that the second primary authentication is performed, transferring the second $K_{AKMA}$ from the NAS entity of the UE to the AKMA entity of the UE, and transferring the second $K_{AF}$ and the first A-KID from the NAS entity of the UE to an application entity of the UE, wherein the AKMA entity of the UE resets the back-off flag.

6. The UE of claim 4, wherein the AKMA controller is further configured to:
perform a primary authentication with an authentication server function (AUSF),
generate a second $K_{AKMA}$ and a second AKMA key identifier (A-KID) from an AUSF key ($K_{AUSF}$),
generate the first $K_{AF}$ using the second $K_{AKMA}$ and an AF-identity (AF-ID) to access an application hosted by the AF server,
establish the communication with the AF server to access the application hosted by the AF server, and
send the second A-KID to the AF server over the established communication.

* * * * *